(12) United States Patent
Miyaoka

(10) Patent No.: US 7,782,722 B2
(45) Date of Patent: Aug. 24, 2010

(54) METHOD OF ADJUSTING SPHERICAL ABERRATION AND FOCUS OFFSET AND INFORMATION RECORDING/REPRODUCTION APPARATUS USING THE SAME

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 11/844,124

(22) Filed: Aug. 23, 2007

(65) Prior Publication Data

US 2008/0056077 A1    Mar. 6, 2008

(30) Foreign Application Priority Data

Aug. 31, 2006   (JP)   .............................. 2006-235625

(51) Int. Cl.
*G11B 7/00* (2006.01)
(52) U.S. Cl. ................................. 369/44.29; 369/44.32
(58) Field of Classification Search ........................ None
See application file for complete search history.

(56) References Cited

U.S. PATENT DOCUMENTS

2003/0107961 A1*   6/2003   Yasuda et al. ............ 369/44.27
2005/0063259 A1*   3/2005   Isshiki et al. ............. 369/44.23
2006/0062098 A1    3/2006   Miyake

FOREIGN PATENT DOCUMENTS

JP        2004-145987        5/2004

\* cited by examiner

*Primary Examiner*—Wayne R Young
*Assistant Examiner*—Brian Butcher
(74) *Attorney, Agent, or Firm*—Fitzpatrick, Cella, Harper & Scinto

(57) ABSTRACT

A method of adjusting spherical aberration correction and focus offset of a light beam. A first approximate straight line is detected indicating a first relationship between the spherical aberration correction and the focus offset according to a first evaluation index indicating a quality of cross-track signal. A second approximate straight line is detected indicating a second relationship between the spherical aberration correction and the focus offset according to a second evaluation index indicating a quality of a reproduced signal. A spherical aberration correction value and a focus offset value, to be adjusted, are determined from an intersection of the first approximate straight line and the second approximate straight line.

19 Claims, 7 Drawing Sheets

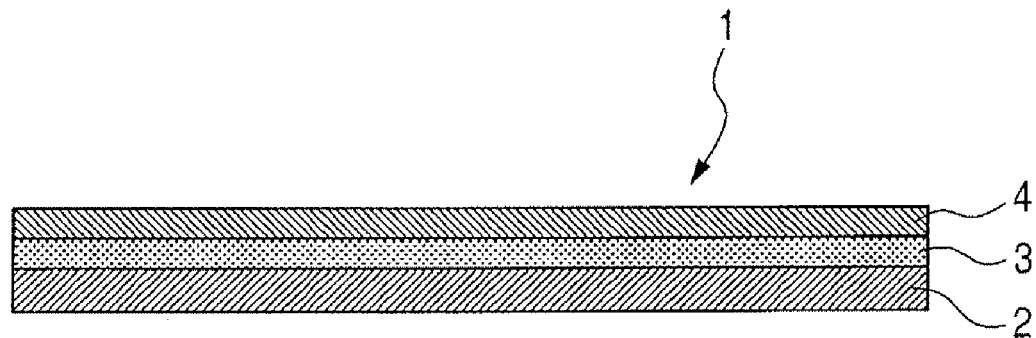
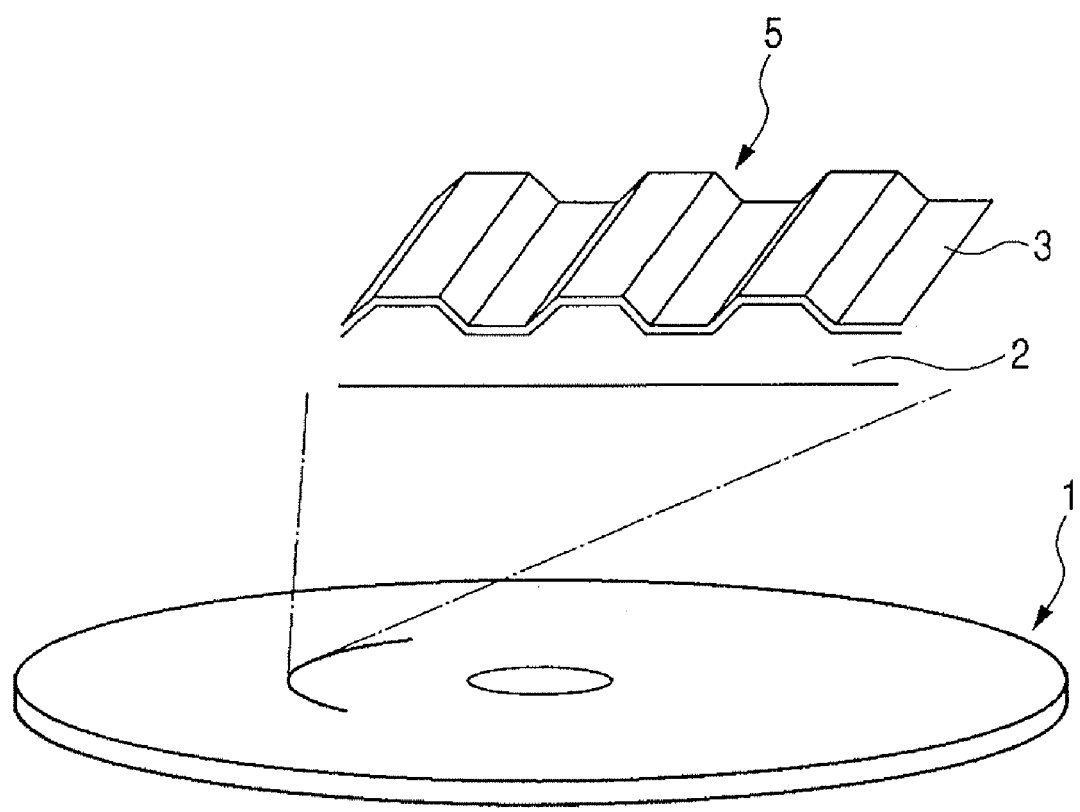

FIG. 7A Tr JUMP COMMAND

FIG. 7B FOCUS OFFSET VALUE

FIG. 7C CROSS-TRACK SIGNAL

METHOD OF ADJUSTING SPHERICAL ABERRATION AND FOCUS OFFSET AND INFORMATION RECORDING/REPRODUCTION APPARATUS USING THE SAME

This application claims the benefit of Japanese Patent Application No. 2006-235625, filed Aug. 31, 2006, which is hereby incorporated by reference herein in its entirety.

BACKGROUND OF THE INVENTION

1. Field of the Invention

The present invention relates to a method of adjusting spherical aberration and focus offset in the field of recording information onto or reproducing information from an information recording medium, such as an optical disk, and an information recording/reproduction apparatus using the same.

2. Description of the Related Art

There has been an increasing demand for optical disks having a high recording density to be used in an information recording/reproduction apparatus, in response to the increase in recent years of the quantity of information to be recorded and reproduced by such an apparatus. Attempts have been made to increase the recording density of optical disks by raising the linear recording density on the information recording layer and reducing the pitch of arrangement of the tracks of the optical disk. In order to raise the recording density of an optical disk, it is necessary to reduce the diameter of the light beam converged to the information recording layer of the optical disk.

Techniques that can be used to reduce the diameter of a light beam to be irradiated onto an optical disk include increasing the numerical aperture (NA) of the objective lens of the focusing optical system in the optical pickup for recording information onto and reproducing information from the optical disk, and decreasing the wavelength of the light beam. With regard to reducing the wavelength of the light beam, it is believed to be possible to reduce the wavelength by replacing a red semiconductor laser, which is being used as a light source, with a blue/purple semiconductor laser, and practical applications of the blue/purple semiconductor lasers have been and are being implemented.

With regard to realizing an objective lens having a high numerical aperture, on the other hand, techniques of combining two semispherical lenses to form (a lens group for) the objective lens and those of using a newly developed single lens have been proposed.

Generally, the information recording layer of an optical disk is coated by a cover layer in order to protect the information recording layer against dust and scratches. Therefore, the light beam coming out from the objective lens becomes converged and focused onto the information recording layer lying under the cover layer. As the light beam passes through the cover layer, spherical aberration occurs due to the variance of the thickness of the cover layer.

The spherical aberration under consideration is expressed by a formula of spherical aberration $\propto t \times NA^4$ (t: the thickness of the cover layer, NA: the numerical aperture of the objective lens). Namely, the spherical aberration is proportional to the thickness t of the cover layer and the fourth power of the NA. Normally, the objective lens is designed to offset the spherical aberration, so that the light beam that passes through the objective lens and the cover layer is converged onto the information recording layer, because the spherical aberration is sufficiently small.

However, if the thickness of the cover layer shifts from the predetermined value, spherical aberration takes place to the light beam converged onto the information recording layer, to consequently give rise to fluctuations of the thermal distribution in a recording operation, and to reduce the resolution in a replay operation, so as to disable the ability to correctly write and read information.

The spherical aberration that arises due to the error $\Delta t$ of the thickness of the cover layer is proportional to the error $\Delta t$ of the thickness of the cover layer. In other words, the spherical aberration increases as the error $\Delta t$ of the thickness of the cover layer increases. Additionally, since the spherical aberration is proportional to the fourth power of the NA, the spherical aberration becomes more remarkable when the NA is increased, provided that the error $\Delta t$ of the thickness of the cover layer remains as it was. Then, the risk that information is neither written nor read correctly will be increased.

Among conventional optical disks, the numerical aperture NA of the objective lens of the optical pickup for DVDs (digital versatile disks) is about 0.6. Therefore, the spherical aberration that arises due to the error $\Delta t$ of the thickness of the cover layer is relatively small, and it is possible to satisfactorily focus the light beam onto the information recording layer.

Meanwhile, multilayer optical disks have been developed for the purpose of increasing the density of recording information in the direction of the height of the optical disk. By definition, such a multilayer optical disk has a multiple information recording layer. For instance, DVDs having two information recording layers have already been marketed. In such a multilayer optical disk, when a number of information recording layers are laid one on the other, the distance from the surface of the optical disk (the surface of the cover layer) to the information recording layer differs from one information recording layer to another information recording layer. Then, as a result, the spherical aberration that arises when the light beam passes through the cover layer of the optical disk differs from the one information recording layer to the other information recording layer.

In the above-described arrangement, the difference of spherical aberration that appears between adjacently located information recording layers is proportional to the interlayer distance t of the adjacent information recording layers, as pointed out above. Thus, spherical aberration arises, which corresponds to the interlayer distance t. However, as far as the current standards for DVD optical systems and the interlayer distance of DVDs are observed, it is possible for DVDs to maintain the required recording/reproduction characteristics without particularly correcting the spherical aberration.

On the other hand, DVD suppliers are promoting technological developments of increasing the recording density of DVDs. The wavelength of the light source will be about 405 nm, and the NA of the objective lens will be 0.85 for DVDs that are required to accommodate such a high recording density. As pointed out above, the spherical aberration becomes more remarkable when the NA is increased, provided that the error $\Delta t$ of the thickness of the cover layer remains as it is. Since spherical aberration is proportional to the fourth power of the NA, spherical aberration will be about four times greater when NA=0.85 than when NA=0.6, if the error $\Delta t$ of the thickness of the cover layer is the same. In other words, the spherical aberration that arises due to the error $\Delta t$ of the thickness of the cover layer becomes highly remarkable, as the NA is raised to as high as NA=0.85.

A similar problem arises for optical disks having a multilayer recording layer. The spherical aberration gives rise to a variance to a large extent as the NA of the objective lens of the optical head increases, provided that the interlayer distance t of adjacent information recording layers remains as it is. For example, the variance of spherical aberration will be about four times greater when NA=0.85 than when NA=0.6, if the interlayer distance t is the same. In other words, the variance of spherical aberration that arises due to the interlayer distance becomes highly remarkable as the NA is raised to as high as NA=0.85.

Thus, the influence of the error of spherical aberration is no longer negligible for an objective lens showing a high NA, because such an error gives rise to the problem of degraded accuracy for both recording and reading information. Then, it becomes necessary to correct the spherical aberration when using an objective lens showing a high NA, in order to realize a high recording density. For this reason, efforts are being paid for research and development of spherical aberration correction mechanisms and spherical aberration correction units.

Additionally, for reproducing information from an optical disk by means of an information recording/reproduction apparatus, it is necessary for the optical head of the apparatus to form a micro beam spot that shows a constant profile when moving along the information track on the optical disk. Therefore, the optical head is adapted to focus servo operations and tracking servo operations. A focus servo operation is a follow-up operation of driving the objective lens in a direction perpendicular to the optical disk, mainly under control, in order to minimize the beam spot. A tracking servo operation is an operation of driving the minimized beam spot to follow the information track under control.

The depth of focus of light irradiated and focused on the information recording surface of an optical disk is proportional to the wavelength $\lambda$ of light and inversely proportional to the square of the numerical aperture NA of the objective lens (the depth of focus $\propto \lambda/NA^2$).

Accordingly, in an optical system where the wavelength of the light beam is reduced, and the objective lens is made to show a large NA in order to improve the recording density, the depth of focus is remarkably reduced as compared with a comparable optical system for currently available DVDs. Therefore, the focus servo system is required to show an excellent follow-up performance.

Thus, it is proposed for optical disk systems of the next generation to introduce a mechanism for correcting the spherical aberration in order to absorb the influence of the error of the thickness of the cover layer that arises when a multilayer recording layer is employed. In other words, it is necessary for a recording/reproduction apparatus to control and to adjust the spherical aberration correction mechanism in order to absorb the influence of the error of the thickness of the cover layer and the difference of the thickness of the cover layer that arises when a multilayer recording layer is employed.

Additionally, the change of the profile of the light spot due to spherical aberration and that of the profile of the light spot due to a focus servo offset show a complementary relationship. Therefore, it is necessary not only to improve the accuracy of focus control, but also, to optimally correct the spherical aberration and to adjust the focus offset under control simultaneously.

Known techniques for optimally adjusting the offset of the focus servo, and also, the spherical aberration correction mechanism in an optical disk system using a high NA object lens include, for instance, the one disclosed in Japanese Patent Application Laid-Open No. 2004-145987.

The above-cited patent document describes a technique of adjusting both the spherical aberration and the focus offset that arise in an optical system by detecting the optimum point for them, using a single evaluation index. More specifically, a spherical aberration correction value is made to vary under the condition of having a predetermined focus offset and the evaluation index value is detected for the obtained various spherical aberration correction values. Then, the spherical aberration correction value that makes the evaluation index best is detected among them, to optimize the spherical aberration correction value.

Thereafter, a focus offset is made to appear under the condition where the optimum spherical correction value is detected, and the evaluation index is determined to be good or bad for the focus offset value, in order to optimize the latter value. Alternatively, the spherical aberration correction value detection process and the focus offset detection process are executed in the inverse order, and the optimum spherical aberration value and the optimum focus offset value are applied as correction values of the drive apparatus.

However, with the technique disclosed in Japanese Patent Application Laid-Open No. 2004-145987, it is necessary to record a signal on an optical disk, to subsequently repeatedly drive and to set the spherical aberration correction mechanism for a number of times, and then, also to replay the optical disk correspondingly for a number of times, in order to adjust the spherical aberration. Similarly, it is necessary to repeatedly replay the optical disk to adjust the focus offset. The time necessary to drive the disk to make a full turn needs to be spent for each session of measuring the spherical aberration and the focus offset by way of such repeated recording and replaying operations.

An optical disk drive apparatus adapted to use a short wavelength (e.g., $\lambda$: 405 nm) and a high NA (e.g., NA: 0.85), as described above, is required to execute a process of adjusting and optimizing various parameters for recording/reproduction each time a disk is inserted. Then, the spherical aberration correction mechanism has to be driven for a number of times, and the optical disk needs to be replayed repeatedly in order to optimize the spherical aberration correction. Such an operation that needs to be conducted each time an optical disk is inserted is time-consuming and is inconvenient for the user.

SUMMARY OF THE INVENTION

Therefore, it is an object of the present invention to provide a method of quickly adjusting spherical aberration and focus offset, and an information recording/reproduction apparatus adapted to use such a method.

According to one aspect, the present invention provides a method of adjusting spherical aberration correction and focus offset of a light beam, comprising steps of detecting a first approximate straight line indicating a first relationship between the spherical aberration correction and the focus offset according to a first evaluation index indicating a quality of a cross-track signal, detecting a second approximate straight line indicating a second relationship between the spherical aberration correction and the focus offset according to a second evaluation index indicating a quality of a reproduced signal, and determining a spherical aberration correction value and a focus offset value to be adjusted from an intersection of the first approximate straight line and the second approximate straight line.

According to another aspect, the present invention provides an information recording/reproduction apparatus comprising a semiconductor laser, an objective lens for focusing a light beam emitted from the semiconductor laser onto a recording medium, a mechanism for correcting spherical aberration appearing in the light beam, a focus control circuit for effecting focus control of the light beam by driving the objective lens, a circuit for adding a focus offset to the focus control, and a controller for executing an adjustment method, to set a determined spherical aberration correction value and a determined focus offset value, respectively, in the mechanism for correcting spherical aberration and the circuit for adding a focus offset.

Further features of the present invention will become apparent from the following description of exemplary embodiments, with reference to the attached drawings.

BRIEF DESCRIPTION OF THE DRAWINGS

FIG. 2 is a schematic cross-sectional view of an optical disk that can be used for the purpose of the present invention.

FIG. 3 is a schematic, conceptual illustration of the information track structure of an optical disk that can be used for the purpose of the present invention.

DESCRIPTION OF THE EMBODIMENTS

Figure 1:
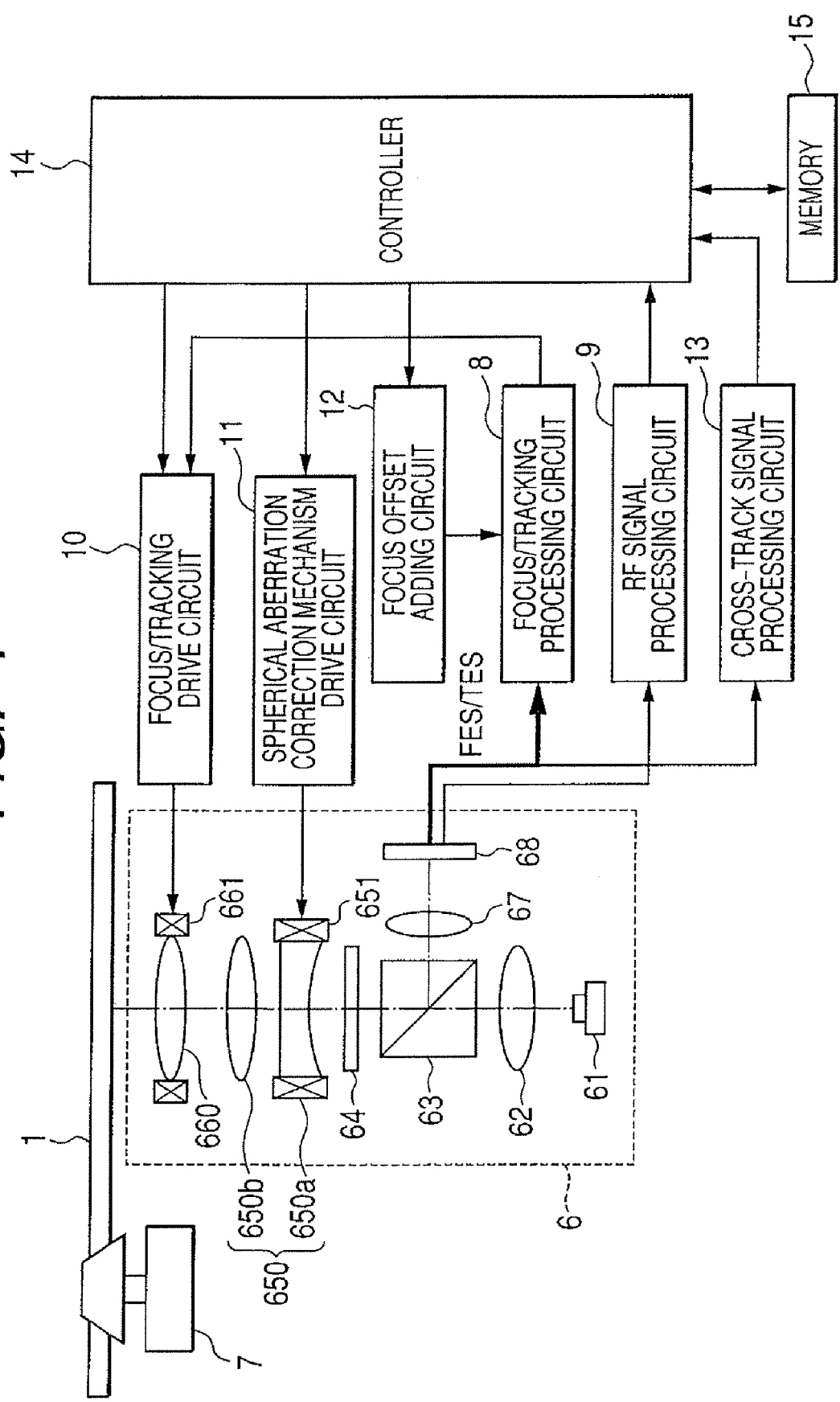
FIG. 1 is a schematic block diagram of an embodiment of an information recording/reproduction apparatus according to the present invention.

Now, the present invention will be described in greater detail by referring to the accompanying drawings, which illustrate the best mode for carrying out the present invention. FIG. 2 is a schematic cross-sectional view of an optical disk that can be used for an information recording/reproduction apparatus according to the present invention. Referring to FIG. 2, optical disk 1 has an information recording layer 3 that includes, for example, a phase change recording film and is formed on a substrate 2 that is made of polycarbonate. Note that, when the optical disk 1 is a read-only disk, the information recording layer 3, which is a reflective film, is formed in place of the phase change recording film.

A cover layer (light transmitting layer) 4 having a thickness of t is formed on the information recording layer 3. The cover layer 4 is made of a plastic material and is formed as a sheet bonded on the information recording layer 3 or by spin coating of an ultraviolet curing resin on the information recording layer 3, which is, in turn, formed on the substrate 2, as pointed out above.

FIG. 3 is a schematic, conceptual illustration of information recording on the optical disk 1 of FIG. 2. The information recording layer 3 of the optical disk 1 is formed on a helical information track 5 or concentric information tracks 5 (to be referred to simply as information track 5 hereafter). The information track 5 is formed as a guide groove on the optical disk 1 to show protrusions and recesses. Information is recorded as marks produced by phase changes on the recesses or the protrusions, or both the recesses and the protrusions of the disk. When the optical disk is a read only disk, the information recording track 5 is formed in advance by arranging pre-pits.

FIG. 1 is a schematic block diagram of an embodiment of an information recording/reproduction apparatus according to the present invention. Note that FIG. 1 mainly illustrates the arrangement relating to focus offset adjustment and spherical aberration adjustment, and the circuits for recording information on and reproducing information from an optical disk are omitted, because they are well known.

In FIG. 1, an optical information recording medium 1, which is an optical disk, is driven to rotate by a spindle motor 7. The optical disk 1 has a structure as illustrated in FIG. 2. Optical pickup 6 irradiates a light beam on the optical disk 1 to record information on or reproduce information from the optical disk 1.

When the information recording/reproduction apparatus is driven to operate for signal recording or signal reproduction, a light beam is irradiated from the optical pickup 6 onto the optical disk 1, and light reflected from the optical disk 1 is received by a photosensor. The received optical signal is converted into an electrical signal and supplied to focus/tracking processing circuit 8 and RF signal processing circuit 9, as well as to cross-track signal processing circuit 13.

The optical pickup 6 includes a semiconductor laser 61, a collimator lens 62, a beam splitter 63, a λ/4 plate 64, a spherical aberration correction optical system 650, a spherical aberration correction optical system drive mechanism 651 and an objective lens 660. It additionally includes a focus/tracking actuator 661, a condenser lens 67 and a photosensor 68.

The semiconductor laser 61 generates a light beam with a predetermined optical power and the laser beam passes through the collimator lens 62, the beam splitter 63 and the λ/4 plate 64 before it enters the spherical aberration correction optical system 650 for correcting the spherical aberration due to the error of the thickness of the cover layer of the optical disk 1.

The spherical aberration correction optical system 650 is typically a beam-expanding type relay lens formed by arranging a concave lens 650a and a convex lens 650b as a pair. Normally, it is adapted to emit collimated light with an expanded beam diameter relative to entering collimated light. It can convert light entering the objective lens 660 into divergent light or convergent light, and adjustably produce spherical aberration by means of the objective lens 660 by changing the gap between the lenses.

The mechanism for adjusting the gap between the lenses is the spherical aberration correction optical system drive mechanism 651. Thus, it is possible to operate the spherical aberration correction optical system 650 as a correction unit for correcting the spherical aberration due to the variance of the thickness of the cover layer of the optical disk 1 by means of the mechanism 651.

The objective lens 660 converges the light beam from the spherical aberration correction optical system 650 on the information track 5 formed on the recording surface of the optical disk 1. Light reflected from the optical disk 1 is detected by the photosensor 68, and a focus error signal (FES) and a tracking error signal (TES) are generated from the output thereof.

A focusing operation is realized by generating a focus drive signal according to the FES signal and displacing the objective lens 660 in the direction perpendicular to the disk surface of the optical disk 1 by driving the focus/tracking actuator 661. A tracking operation is realized by generating a tracking drive signal according to the TES signal and displacing the objective lens 660 in a radial direction of the optical disk 1 by driving the focus/tracking actuator 661.

The FES signal and the TES signal are generated by the focus/tracking processing circuit 8, while the focus drive signal and the tracking drive signal are generated by the focus/tracking drive circuit 10.

Known methods for detecting a focus error signal include the astigmatic method, the knife-edge method and the spot size detection method. Any known method may be used for focus error detection, for the purpose of the present invention, because it does not relate to the essence of the present invention. Known methods for detecting a tracking error signal include the push-pull method and the DPD (differential phase detection) method. Any known method may be used for tracking error detection for the purpose of the present invention, because it likewise does not relate to the essence of the present invention.

The controller 14 operates for driving the optical disk 1, turning on/off the semiconductor laser 61, controlling the servo systems, driving and controlling the spherical aberration correction mechanism, executing arithmetic processes for evaluation indexes and storing information on the information recording/reproduction apparatus in advance. For example, as the optical disk 1 is set in place in the information recording/reproduction apparatus, the controller 14 causes the optical disk 1 to rotate by driving the spindle motor 7, controlling the optical disk 1 to turn at a constant linear velocity or at a constant number of revolutions per unit time.

After ending pre-processing operations, such as causing the optical disk 1 to rotate and turning on/off the semiconductor laser 61, the controller 14 controls the focus/tracking drive circuit 10 to start focus control. At this time, it drives the focus/tracking drive circuit 10 by means of a signal that is appropriately processed for phase compensation, and so on, by the focus/tracking processing circuit 8, for the purpose of focus control. Additionally, the controller 14 operates for offset adjustment of focus control by inputting a signal to a focus offset adding circuit 12, and adjusts the focused condition of the beam spot on the optical disk 1, by intentionally adding an offset to the servo control loop.

Still additionally, the controller 14 controls the focus/tracking drive circuit 10 for tracking control. At this time, it drives the focus/tracking drive circuit 10 by means of a signal that is appropriately processed for phase compensation, and so on, by the focus/tracking processing circuit 8, for the purpose of tracking control. Furthermore, the controller 14 operates for track jump control by inputting a signal to the focus/tracking drive circuit 10 and making it output a tracking jump drive signal to the tracking coil of the focus/tracking actuator 661.

The operation of controlling the spherical aberration correction mechanism drive circuit 11 constitutes an important role that the controller 14 takes. According to the present invention, the controller 14 also takes another important role of reading information specific to the optical pickup that relates to the relationship between the spherical aberration correction value and the focus offset value from the memory 15, and also writing such information to the memory 15.

On the other hand, the reproduced signal from the information recording layer 3 of the optical disk 1 is output from the optical pickup 6 and processed in the RF signal processing circuit 9 before it is sent out to the controller 14.

The controller 14 also has a function of arithmetically processing and determining the evaluation indexes of various signals. According to the present invention, the spherical aberration correction value and the focus offset value are optimized by using evaluation indexes relating to reproduced signals, and also, evaluation indexes relating to crossing the track.

Examples of evaluation indexes relating to reproduced signals that can be used for the purpose of the present invention include (1) reproduced signal amplitude, (2) reproduced signal asymmetry, (3) measured timing jitter value, (4) statistically processed value of a likelihood of a difference at the time of joining predetermined paths for Viterbi decoding (SAM), and (5) measured error rate.

Detection of the largest amplitude of the reproduced signal and/or MTF detection by means of amplitude ratio of different mark lengths may be used for the reproduced signal amplitude of index 1.

The ratio of the center value of the smallest mark signal amplitude and the center value of the largest mark signal amplitude, or the ratio of the "+" amplitude and the "−" amplitude at the time of AC coupling of the reproduced signal, may be used for the reproduced signal asymmetry of index 2. Both of the above ratios are believed to be effective evaluation indexes, especially for write once mediums.

Measurement of the timing jitter in an interpolation process of the sampling level of the reproduced signal and/or measurement of the timing jitter using phase error information on PLL are examples that can be used for measuring the timing jitter of index 3.

When maximum likelihood decoding, such as Viterbi decoding, is used for processing the reproduced signal, the likelihood difference is computed between the candidate paths at the time of selecting a predetermined path and the signal quality is evaluated by means of the statistical value of the likelihood difference for the statistically processed value of the likelihood difference at the time of joining predetermined paths for Viterbi decoding (SAM) of index 4. Such an evaluation index is highly correlated with the error rate, so that, in recent years, research has been conducted on such evaluation indexes.

Known recorded information and reproduced information are compared, and the bit error rate is measured for the measured error rate of index 5.

The push-pull signal amplitude observed at the time of crossing the track can be used as an evaluation index relating to crossing the track. The cross-track signal processing circuit 13 executes a signal amplitude measurement process on the push-pull signal, or the cross-track signal according to the push-pull signal at the time of crossing the track. The signal processed at the cross-track signal processing circuit 13 is sent out to the controller 14.

Now, the method of correcting the spherical aberration, and adjusting the focus offset with the above-described arrangement, will be described below.

First, the basic characteristics of the method of correcting the spherical aberration and adjusting the focus offset according to the present invention will be discussed.

A. Two signal evaluation indexes that differ from each other in terms of the dependency of the optimum point of the focus offset value relative to the change in the spherical aberration correction value or the dependency of the optimum point of the spherical aberration correction value relative to the change in the focus offset value are employed. The spherical aberration correction value and the focus offset value that give optimum points for the different evaluation indexes become ultimate optimum points.

B. For the dependencies referred to in A above, the inclinations of the approximate straight lines that show the respective dependencies have values specific to the optical pickup.

The optimization of the spherical aberration correction value and the focus offset value is adjusted by utilizing the above two characteristics.

First, the two different signal evaluation indexes referred to in A will be described further below. The first evaluation index is an evaluation index for expressing the quality of the cross-track signal. For example, the amplitude of a cross-track signal, such as a push-pull signal, a differential push-pull signal based on the push-pull signal and a divided push-pull signal normalized by a sum signal may be used for such an evaluation index.

The second evaluation index is an evaluation index for expressing the quality of the reproduced signal. Typical examples that can be used for such an evaluation index include the reproduced signal amplitude, the measured timing jitter value, the statistically processed value of likelihood difference at the time of joining predetermined paths for Viterbi decoding, and the measured error rate, as pointed out above.

The above-described two evaluation indexes are characterized in that they differ from each other in terms of the dependency of the focus optimum point on the spherical aberration correction value or the dependency of the spherical aberration optimum point on the focus offset value. Thus, the present invention is characterized in that the focus offset value that respectively gives optimum points to the two evaluation indexes and the corresponding spherical aberration correction value are determined as optimum points.

Figure 4:
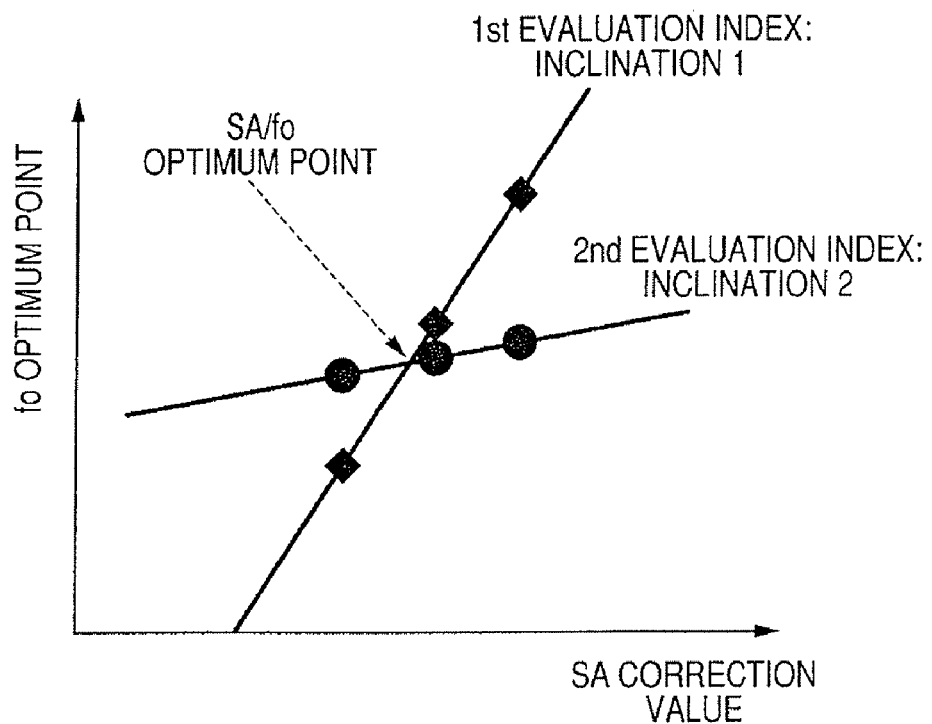
FIG. 4 is a graph illustrating the dependency of the focus offset optimum value on the spherical aberration correction value for the evaluation of the cross-track signal amplitude, and that of the reproduced signal amplitude, for the purpose of the present invention.

This characteristic will be described further by referring to FIG. 4. In FIG. 4, the horizontal axis indicates the spherical aberration correction value and the vertical axis indicates the optimum point of the focus offset for both the first evaluation index and the second evaluation index. Note that the first evaluation index is the amplitude of the push-pull signal that indicates the cross-track signal, and the optimum point of the focus offset refers to the focus offset value that gives the maximum value to the amplitude of the push-pull signal.

The second evaluation index is the amplitude of the reproduced signal, and the optimum point of the focus offset refers to the focus offset value that gives the maximum value to the amplitude of the reproduced signal. As a result of research made by the inventors of the present invention, it has been verified that the energy density of the light beam is highest at the intersection of the approximate straight line of the first evaluation index and the approximate straight line of the second evaluation index, among the possible combinations of spherical aberration correction values and focus offset values, so that it is possible to record information with the lowest possible power by using the intersection. It has also been verified that the amplitude of the reproduced signal also becomes largest at the intersection. Thus, it is safe to believe that the intersection of the approximate straight line of the first evaluation index and that of the second evaluation index gives the optimum point for both the spherical aberration correction value and the focus offset value.

Additionally, with regard to the two evaluation indexes mentioned above, the inventors of the present invention also found that the inclination of the approximate straight line showing the dependency of the focus offset optimum point on the spherical aberration correction value remains constant, regardless of the disk being used, as pointed out in B above. (Conversely, the inclination of the approximate straight line illustrating the dependency of the optimum point of the spherical aberration correction value on the focus offset value remains constant in the embodiment described hereafter, by referring to FIG. 10.) Note that the inclinations of the approximate straight lines are expressed as the first evaluation index: inclination 1 and the second evaluation index: inclination 2, in FIG. 4.

Thus, it has been found by the inventors of the present invention that, once the optical pickup is identified, the inclinations of the approximate straight lines showing the dependencies of the two evaluation indexes remain constant if the thickness of the cover layer of the optical disk shows variance, and the optimum spherical aberration correction value and the optimum focus offset value fluctuate.

Now, the present invention, which is based on the above characteristics A and B, will be described summarily below. First, information on the inclinations of the two evaluation indexes, which are the characteristic B, is stored in the apparatus (memory 15) in advance.

Figure 5:
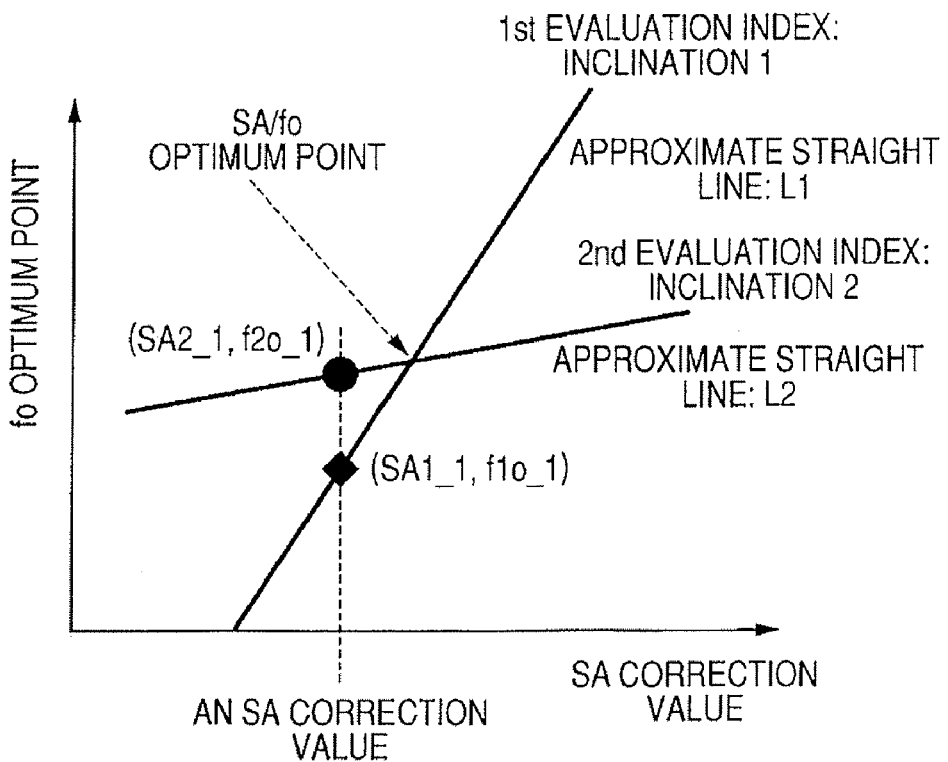
FIG. 5 is a graph illustrating the dependency of the focus offset optimum value on the spherical aberration correction value for the evaluation of the cross-track signal amplitude and that of the reproduced signal amplitude that characterizes the present invention.

When optimizing the spherical aberration correction value and the focus offset value for an optical disk, the focus offset dependency is measured for a certain spherical aberration correction value by using the two evaluation indexes, as illustrated in FIG. 5. Subsequently, optimum points of the focus offset (SA1_1, f1o_1) and (SA2_1, f2o_1) are detected for the two evaluation indexes.

Then, it is possible to identify the approximate straight lines that show the respective dependencies of the two evaluation indexes on the spherical aberration correction value and the focus offset value from the information on the two evaluation indexes, and the detected (SA1_1, f1o_1) and (SA2_1, f2o_1). Once the two approximate straight lines are identified, the intersection of the two straight lines is unequivocally determined, so that it is possible to determine the optimum point for both the spherical aberration correction value and the focus offset value from the characteristic A.

The present invention is summarily described above. Now, the method of adjusting the spherical aberration correction value and the focus offset value will be described specifically, by way of an example where the push-pull signal amplitude and the reproduced signal amplitude are respectively used as the evaluation index expressing the quality of the push-pull signal amplitude and the evaluation index expressing the quality of the reproduced signal. In this example, a measurement process of changing the focus offset value for a certain spherical aberration correction value and detecting the focus offset optimum point will be described.

Figure 6:
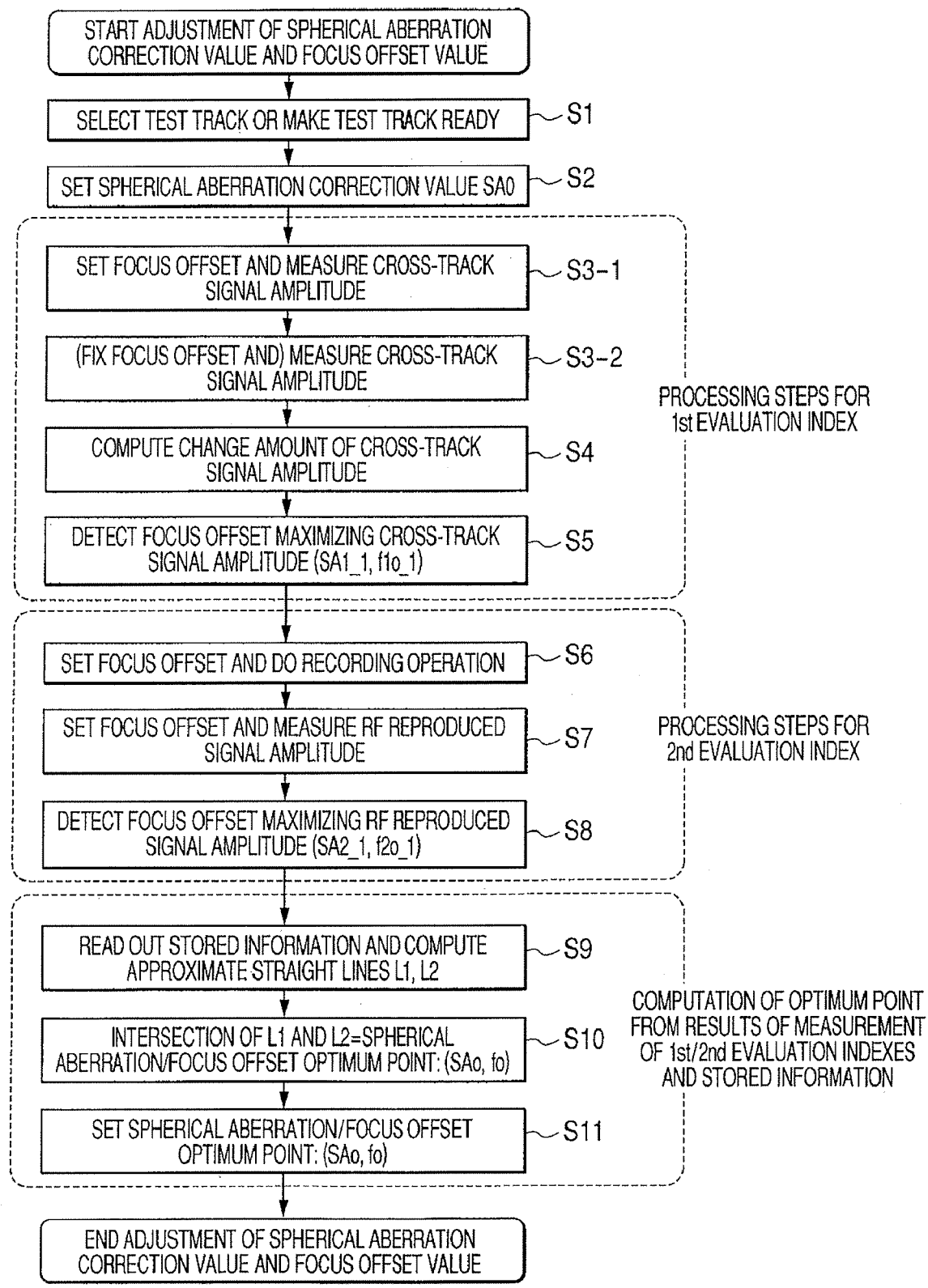
FIG. 6 is a flowchart of an adjusting step of an adjusting method according to the present invention.

FIG. 6 is a flowchart of the process of adjusting the spherical aberration correction value and the focus offset value according to the present invention. The above example will be described below by referring to the flowchart of FIG. 6. Note that, in FIG. 6, the processing steps S3 through S5 are for the first evaluation index and the processing steps S6 through S8 are for the second evaluation index, whereas the processing steps S9 through S11 are for computationally setting the optimum points from the results of the measurement of the first and second evaluation indexes and the stored information.

As the adjustment process is started, the controller 14 moves the optical pickup 6 to a desired test region. In the case of a write-once medium, the controller 14 selects at least a test track whose adjacent tracks have not been used for recording, in order to eliminate the influence of crosstalk and that of fluctuations of the condition of measurement due to a recorded or an unrecorded state of the push-pull signal for measuring the reproduction amplitude.

In the case of an erasable and rewritable medium, the controller 14 selects at least a test track of which adjacent tracks have not been used for recording or erases three, or more than three, tracks sandwiching the track to be used as a test track. In the case of a ROM medium, it is not necessary to specify a particular test region. However, if a test track is specified, the controller selects it (S1).

Then, the controller 14 drives the spherical aberration correction optical system drive mechanism 651 by means of the spherical aberration correction mechanism drive circuit 11 and sets the spherical aberration correction value to an initial value SA0 (S2).

The initial value will be described here. While the spherical aberration correction value for the ideal cover layer thickness of the optical disk 1 may be selected for the initial value, the present invention is by no means limited thereto. For instance, the controller 14 may read information on the readable burst cutting region at the innermost periphery of the disk, to identify the disk manufacturer and the serial number, regardless of the pickup optical system. When the spherical aberration correction value of the disk type that has been used before is recorded in the apparatus, the spherical aberration correction value that is recorded in the apparatus may be selected for the initial value.

Then, the controller 14 observes the focus offset dependency of the spherical aberration correction value, using the amplitude of the push-pull signal at the track-crossing time as the first evaluation index. It measures the focus offset dependency of the selected spherical aberration correction value SA0 and determines the focus offset optimum point at this time (S3-1).

More specifically, the controller 14 divides a track into a plurality of areas for the spherical aberration correction value SA0 and changes the set value of the focus offset within a predetermined range in each of the areas produced by the division by controlling the focus offset adding circuit 12.

After controlling the focus offset value, the controller 14 effects an operation of jumping to the "−1" adjacent track or the "+1" adjacent track and returning to the initial track under control in each of the divided areas. Simultaneously, the controller 14 measures the push-pull signal amplitude at the time of jumping a track by means of the cross-track signal processing circuit 13.

Figure 7:
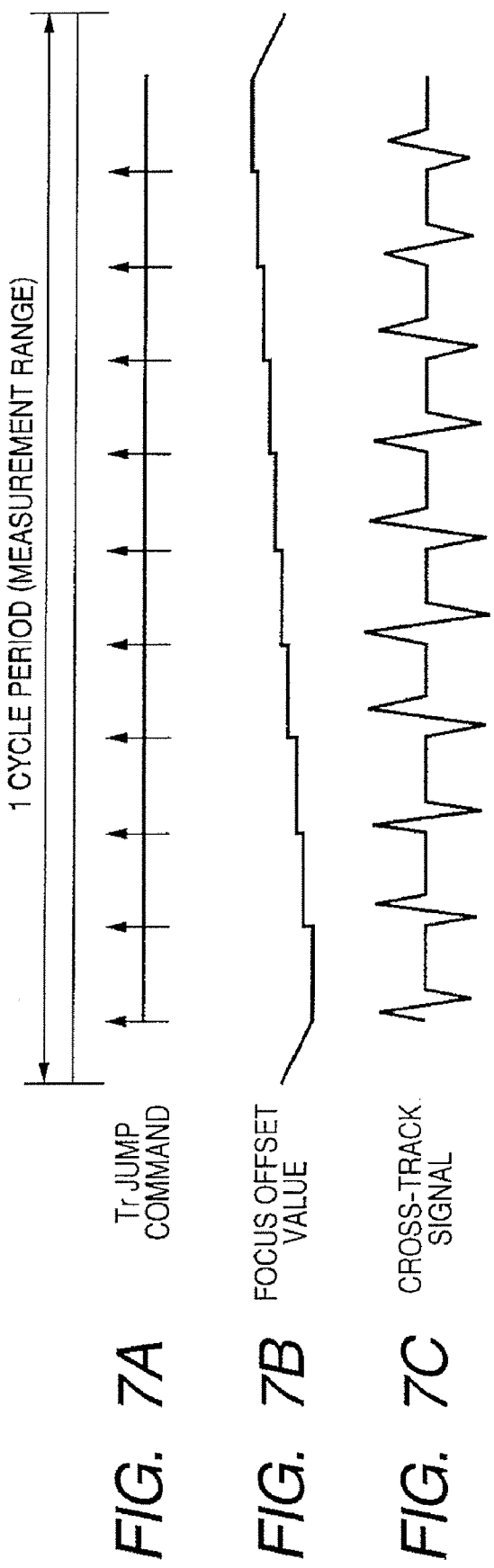
FIGS. 7A, 7B and 7C are schematic, conceptual illustrations of the operation of measuring a cross-track signal for the purpose of the present invention.

FIGS. 7A, 7B and 7C schematically illustrate an operation of dividing a track into ten areas and effecting a track jump in each of the divided areas. FIG. 7A illustrates track-jump commands (indicated by an arrow) from the controller 14 and FIG. 7B illustrates how the focus offset amount varies, while FIG. 7C illustrates the push-pull signal changes at the track jump time.

No particular limitations are imposed on the amplitude measuring method that the cross-track signal processing circuit 13 employs. For example, a measuring method of sampling peak values/bottom values by peak/bottom detection may be used. In the case of a ROM medium for which an optical system of wavelength λ: 405 nm/NA: 0.85 is used, it is known that the percentage modulation of the push-pull signal is observable regardless of the pit depth. Therefore, it is possible to measure the amplitude for any rewritable/write-once/ROM medium.

It is also known that the push-pull signal amplitude shows dispersion within a single track. Therefore, the focus offset is set to a reference value and the push-pull amplitude of the observed track is measured in a similar manner, without changing the focus offset, in order to reduce the influence on the change in the measured amplitude that can take place when the focus offset is altered. A technique of using the outcome of the measurement as a reference value and standardizing it to use it as the push-pull amplitude dependency on the focus offset value may be conceivable (S3-2).

Figure 8:
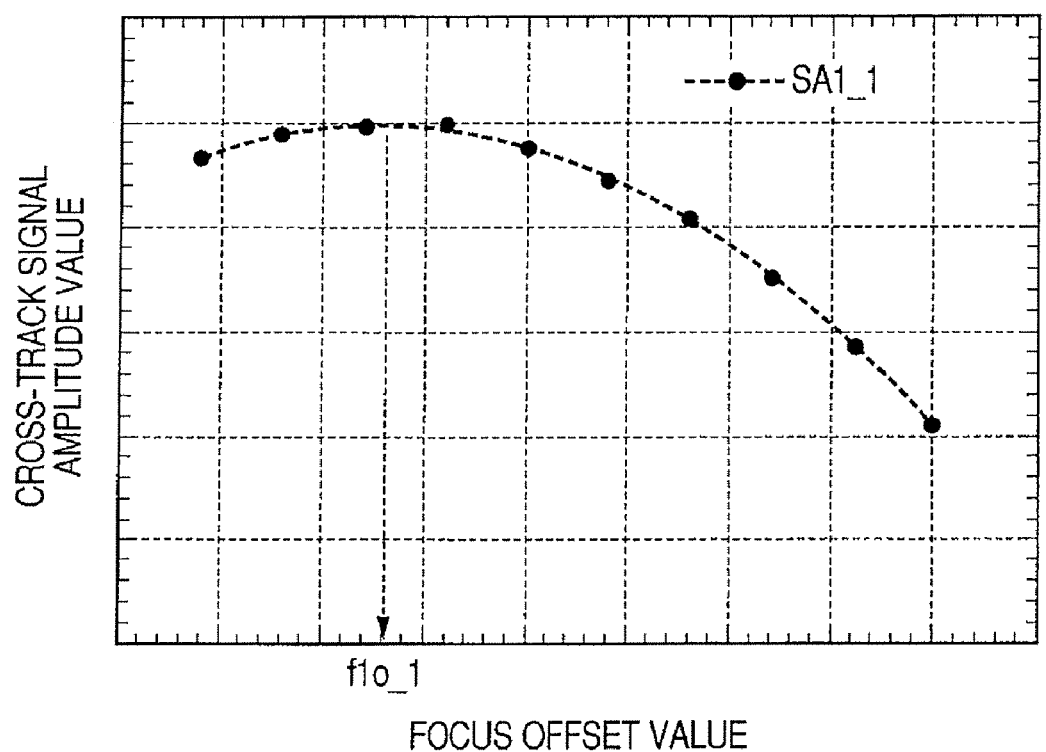
FIG. 8 is a graph illustrating the dependency of the cross-track signal amplitude on the focus offset value.

As a result of the above measurements, the dependency of the push-pull amplitude that arises due to the alteration of the focus offset value is obtained, as illustrated in FIG. 8 (S4). Then, the focus offset value f1$o$_1 that maximizes the push-pull amplitude is computed to determine (SA1_1, f1$o$_1) by polynomial approximation (quadratic approximation, in this case) of the outcome of the measurement (S5).

While an operation of measuring the amplitude of the cross-track signal by means of track jumps has been discussed above, the present invention is by no means limited thereto. For example, a technique of superposing a sinusoidal wave of a predetermined frequency on the focus/tracking drive circuit 10 in a tracking servo off state and driving the objective lens 660 in a transversal direction of the track, to measure the cross-track signal amplitude, may naturally be conceivable.

While a large number of tracks in an unrecorded state is required for such a technique, the measurement operation can be conducted stably by using an unrecorded region where disk information is recorded as a wobble signal, which is a signal in the groove.

Next, the focus offset dependency on the spherical aberration correction value is observed by using the signal amplitude of the reproduced signal as an evaluation index. At this time, the spherical aberration correction mechanism is driven to maintain the state where the push-pull amplitude was measured at the time of crossing the track.

While the same spherical aberration correction value is selected for different evaluation indexes when observing the focus offset dependency in the above-described example, the present invention is by no means limited thereto, and different spherical aberration correction values may alternatively be used.

In the case of a ROM disk, evaluation indexes are observed only by way of a replay operation, because information cannot be written on the disk. In the case of a recordable disk, on the other hand, it is possible to observe the spherical aberration/focus offset dependencies more accurately if a recording operation is involved.

The changes in the spherical aberration and the focus offset in a replay operation in turn change the optical resolution, and the quality of the reproduced signal due to the change in the quality of the light beam changes.

On the other hand, when a recording operation is involved, the power density of the light beam changes with the change in the optical resolution that takes place due to the change in the quality of the light beam, to consequently change the quality of the recording mark, so that the quality of the reproduced signal is also changed due to the synergistic effect of recording/reproduction. Therefore, it is possible to observe the spherical aberration/focus offset dependencies more accurately when a recording operation is involved. According to a study by the inventors of the present invention, it has been found that the detection sensitivity involving a recording operation is about twice as high as the sensitivity that does not involve any recording operation.

As for the selected value of recording power, a power amplitude that changes remarkably depending on the recording power is preferably used. However, according to a study by the inventors of the present invention, it is possible to observe the spherical aberration/focus offset dependencies with a high detection sensitivity by using recording power close to the optimum recording power, whose amplitude is nearly saturated. In other words, it makes hardly any sense to stick to a particular recording power level, and the recording power described in the disk information may be used without any problem.

Now, the measurement of the evaluation indexes involving a recording operation will be described below. The recording operation process described below may be omitted in the case of a ROM disk or a measurement using only a replay operation.

First, the controller 14 divides a track into a plurality of areas for the spherical aberration correction value SA0, and changes the set value of the focus offset within a predetermined range in each of the areas produced by the division by controlling the focus offset adding circuit 12. Thus, strings of recording signals showing the different focus offset values observed at the time of recording are formed corresponding to the division (S6).

Subsequently, a replay operation is started. In this operation, the controller 14 divides a track into a plurality of areas for the spherical aberration correction value SA0, and sets the focus offset value that is the same as the one used for the recording operation in each of the divided areas.

The value of the divisor does not necessarily need to be the same for the two different evaluation indexes, and the range, in which the focus offset is changed, does not necessarily need to be limited to the same value. The amplitude of the reproduced signal is measured for each of the focus offset values by the RF signal processing circuit 9 simultaneously with the focus control operation (S7).

The method to be used for measuring the amplitude is not subjected to any particular limitations. For example, a measuring method of sampling peak values/bottom values by peak/bottom detection may be used.

Now, as a method of observing the relative change of the amplitude of the reproduced signal, it is assumed here to employ a technique of sampling the reproduced signal at a predetermined cycle period and computing the standard deviation of the sampled amplitude values. This observation technique is based on the condition that the reproduced signal shows a periodicity of mark/non-mark within a sufficiently small range or randomness of mark/non-mark relative to the sampling region. In other words, such a recording signal needs to be recorded for the observation. Examples of such signals include monotone signals and random signals whose DSV (digital sum value) is limited to a sufficiently small level.

Now, the technique will be described further. The reproduced signal is sampled to obtain a predetermined number of samples in each of the divided areas with the channel clock of the recording data string or integer times thereof. It is not necessary for the sampling clock to be synchronized with the reproduced signal. In other words, a sampling clock that is asynchronous with the reproduced signal can be used without any problem.

When each sampled value is Xi and the number of samples is n, the standard deviation (Stdv) of the signal amplitudes of the sampled signal is determined by the formula illustrated below.

$$Stdv = 1/n \{ \Sigma Xi^2 - [(\Sigma Xi)^2]/n \}^{1/2} \quad (1)$$

As seen from the formula (1), a value corresponding to the modulated amplitude is computationally determined without a problem.

The largest advantage of the above-described technique is that it can minimize the influence of the abnormal part, if any, of the reflectance produced by scratches and dust in the observed region. The peak/bottom detection technique listed above as a popular example tends to follow the sites where the reflectance is abnormally large or small for some reason or another, as so many peaks or bottoms and the peak values/the bottom values are converged with a time constant. Then, the amplitude is observed to be large in the problem region, to consequently degrade the accuracy of the amplitude measurement.

It is also possible to obtain the absolute value of the amplitude by multiplying the Stdv by a predetermined constant. Since the object of the observation here is to see the relative amplitude relationship, a comparison employing the Stdv value will be satisfactory.

Figure 9:
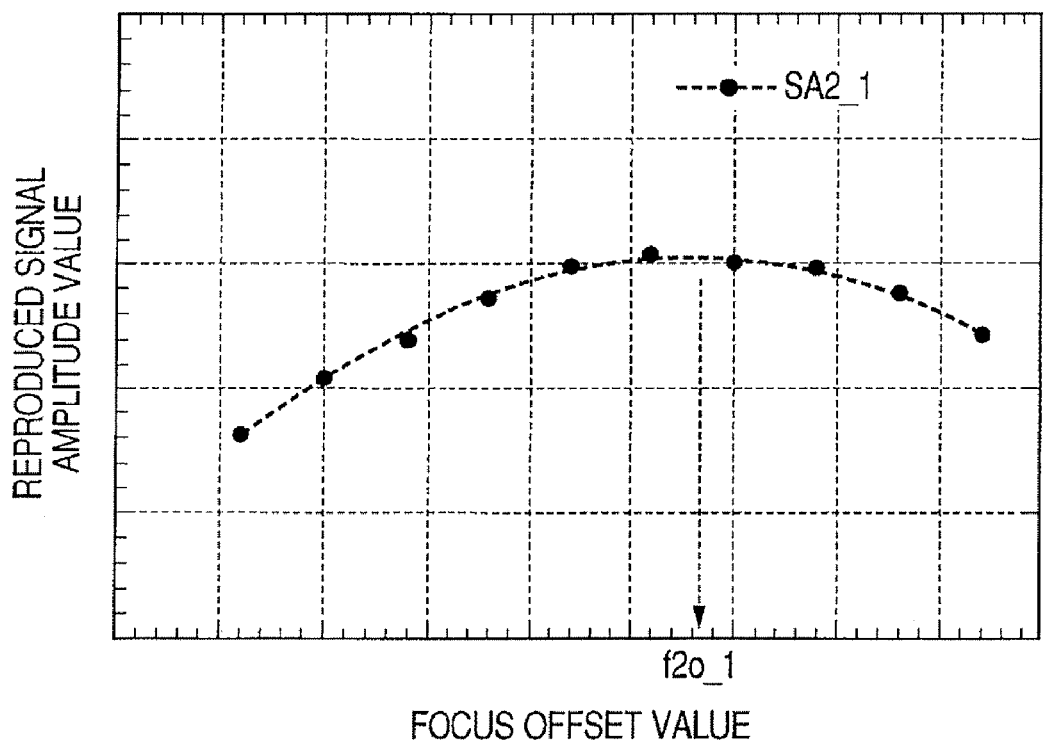
FIG. 9 is a graph illustrating the dependency of the reproduced signal amplitude on the focus offset value.

The reproduced signal amplitude dependency on the focus offset value is obtained from the Stdv value of each divided area that is computed from the sampled values, as illustrated in FIG. 9. Additionally, the focus offset value f2$o$_1 that maximizes the reproduced signal amplitude is computed to determine (SA2_1, f2$o$_1) by polynomial approximation (quadratic approximation, in this case) (S8).

Then, the approximate straight line is determined for the spherical aberration correction value of the focus offset optimum point for each of the evaluation indexes of the two different types illustrated in FIG. 5.

To do this, the information showing the relationship between the spherical aberration correction value and the focus offset that is stored in the apparatus is utilized along with (SA1_1, f1$o$_1) for the first evaluation index and (SA2_1, f2$o$_1) for the second evaluation index, which are detected in a manner as described above. Then, the approximate straight line of the spherical aberration correction value at the focus offset optimum point is determined for each of the two evaluation indexes of the two different types.

The information illustrating the relationship between the spherical aberration correction value and the focus offset that is stored in the apparatus includes the inclination of the approximate straight line that indicates the optimum point dependency of the focus offset relative to the spherical aberration correction value or information for computing the inclination for each of the first and second evaluation indexes as described above, by referring to FIG. 4. Thus, the information may include the inclination 1 and the inclination 2 shown in FIG. 4.

As described above by referring to the basic characteristic B of the present invention, it has been found as a result of a study by the inventors of the present invention that the inclinations of the approximate straight lines illustrating the optimum point dependency of the focus offset relative to the spherical aberration correction value for both the first and second evaluation indexes show values that are specific to each optical pickup.

In other words, it has been found that the inclinations of the approximate straight lines illustrating the optimum point dependency of the focus offset relative to the spherical aberration correction value for the first and second evaluation indexes do not change if the optimum points of the spherical aberration correction value and the focus offset value change due to the change in the cover layer thickness of the optical disk.

Thus, it is possible to unequivocally determine the approximate straight lines L1 and L2 illustrating the optimum point dependency of the focus offset relative to the spherical aberration correction value for the first and second evaluation indexes from the information on the inclinations and the results of observation (SA1_1, f1$o$_1) and (SA2_1, f2$o$_1) for single points on the respective approximate straight lines (S9).

More specifically, the approximate straight line L1 is a straight line that shows inclination 1 and passes through (SA1_1, f1o_1) and the approximate straight line L2 is a straight line that shows inclination 2 and passes through (SA2_1, f2o_1).

As the approximate straight lines L1 and L2 are determined, it is now possible to computationally determine the intersection (SAo, fo) of the two lines L1 and L2. Then, as a result, it is possible to know the optimum spherical aberration correction value: SAo and the optimum focus offset value: fo to be achieved by adjustment (S10).

Thus, when recording information on or reproducing information from the optical disk 1, the spherical aberration correction value: SAo and the focus offset value: fo obtained for the information recording/reproduction apparatus are set in place before proceeding to the subsequent operations of the apparatus (S11).

The information to be stored in the apparatus (memory 15) in advance may include information that can be obtained by sampling as characteristics in terms of designing the optical system and/or information that can be obtained by inspections and measurements at the time of assembling on the shop floor and/or at the time of shipment as characteristics of the individual optical pickup. Besides, information obtained by a measurement by the user when he or she operates the apparatus or the apparatus is in an idle state may also be stored in the apparatus. This information may be updated.

While the focus offset is adjusted in ten stages in the above-described embodiment, the present invention is by no means limited thereto and the number of stages may alternatively be determined from the viewpoint of the speed of setting them and/or the accuracy of measurement.

While a track is selected as the range of altering/measuring the evaluation indexes in the above-described embodiment, the present invention is by no means limited thereto, and an information recording unit conforming to the disk format may alternatively be used as the range. For instance, an ECC cluster that is an integer times of a track may be selected for the range of measurement and a sector may be selected for the range of alteration.

Additionally, while the reproduced signal amplitude is used as an evaluation index of the quality of the reproduced signal in the above-described embodiment, the present invention is by no means limited thereto. Furthermore, the present invention can equally be applied to optical disks having a multilayer structure where a plurality of recording layers are formed.

Figure 10:
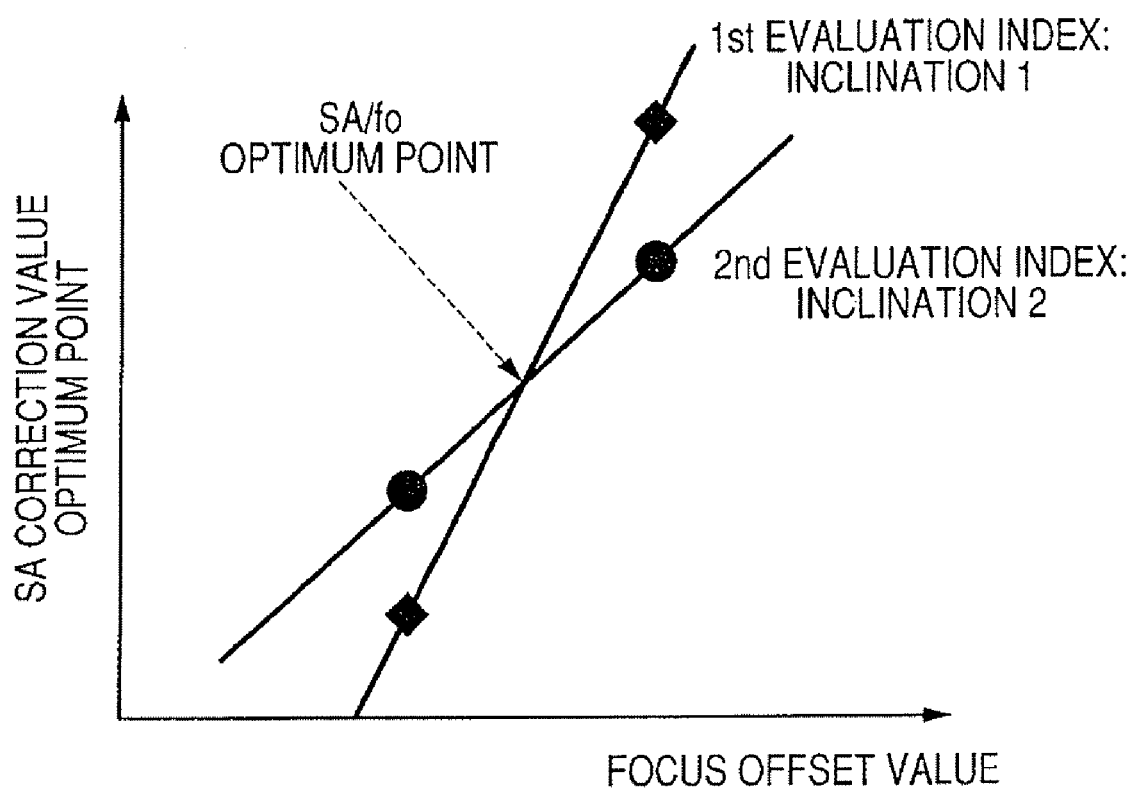
FIG. 10 is a graph illustrating the dependency of the spherical aberration correction optimum point on the focus offset value for the evaluation of the cross-track signal amplitude and that of the reproduced signal amplitude.

Now, another embodiment of the present invention will be described below. FIG. 10 is a graph illustrating the dependency of the spherical aberration correction optimum point on the focus offset value for both the first and second evaluation indexes. In the graph, the intersection of the approximate straight lines showing the dependency of the first and second evaluation indexes gives the spherical aberration correction value and the focus offset value optimum point as in the case of the optimum point dependency of the focus offset value relative to the spherical aberration correction value.

Therefore, while a technique of changing the focus offset relative to a certain spherical aberration correction value and observing the focus offset dependency of the first and second evaluation indexes is described for the first embodiment by referring to FIGS. 4, 5, 6, 7A, 7B, 7C, 8 and 9, the process of the above-described technique is inverted for this embodiment. More specifically, the spherical aberration correction value is changed relative to a certain focus offset value to observe the spherical aberration correction value dependency of the first and second evaluation indexes to obtain similar results. It may be needless to say that the information on the inclinations stored in the apparatus is also inverted.

As described above in detail, according to the present invention, two evaluation indexes including an evaluation index showing the amplitude of a cross-track signal and an evaluation index showing the quality of a reproduced signal are utilized, and information on the relationship between the spherical aberration correction value and the focus offset value that is specific to the optical pickup is stored for the evaluation indexes. Then, an optimum point is determined for the focus offset value and the spherical aberration correction value from the outcome of the observation of either the focus offset dependency at a certain spherical aberration correction value or the spherical aberration correction value dependency at a certain focus offset value and the information stored in the apparatus.

Therefore, according to the present invention, it is possible to reduce the number of steps for adjusting the spherical aberration correction value and the focus offset value without damaging the accuracy of adjustment of the focus offset and the spherical aberration correction system. Thus, it is possible to reduce the time required for adjusting the spherical aberration correction value and, hence, the standby time until the information recording/reproduction apparatus becomes available for recording or reproducing information. Thus, the user no longer needs to be overly concerned about the operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of adjusting spherical aberration correction and focus offset of a light beam, said method comprising steps of:
   detecting a first approximate straight line indicating a first relationship between the spherical aberration correction and the focus offset according to a first evaluation index indicating quality of a cross-track signal;
   detecting a second approximate straight line indicating a second relationship between the spherical aberration correction and the focus offset according to a second evaluation index indicating quality of a reproduced signal;
   determining a spherical aberration correction value and a focus offset value to be adjusted from an intersection of the first approximate straight line and the second approximate straight line; and
   adjusting a spherical aberration correction circuit and a focus offset circuit using the determined values.

2. The method according to claim 1, wherein the step of detecting the first approximate straight line includes:
   measuring a dependency of the first evaluation index on the focus offset value on a pre-selected single spherical aberration correction value and detecting a first focus offset value that makes the first evaluation index show a predetermined value; and
   computationally determining the first approximate straight line from information stored in advance to indicate a dependency of the focus offset on the spherical aberration correction for the first evaluation index and the detected first focus offset value.

3. The method according to claim 1, wherein the step of detecting the second approximate straight line includes:

measuring a dependency of the second evaluation index on the focus offset value on a pre-selected single spherical aberration correction value and detecting a second focus offset value that makes the second evaluation index show a predetermined value; and computationally determining the second approximate straight line from information stored in advance to indicate a dependency of the focus offset on the spherical aberration correction for the second evaluation index and the detected second focus offset value.

4. The method according to claim 2, wherein the information is information on the inclination of the first approximate straight line, indicating the dependency of the focus offset on the spherical aberration correction for the first evaluation index.

5. The method according to claim 3, wherein the information is information on the inclination of the second approximate straight line, indicating the dependency of the focus offset on the spherical aberration correction for the second evaluation index.

6. The method according to claim 1, wherein the step of detecting the first approximate straight line includes:

measuring a dependency of the first evaluation index on the spherical aberration correction for a pre-selected single focus offset value and detecting a first spherical aberration correction value that makes the first evaluation index show a predetermined value; and computationally determining the first approximate straight line from information stored in advance, to indicate a dependency of the spherical aberration correction on the focus offset for the first evaluation index and the detected first spherical aberration correction value.

7. The method according to claim 1, wherein the step of detecting the second approximate straight line includes:

measuring a dependency of the second evaluation index on the spherical aberration correction for a pre-selected single focus offset value and detecting a second spherical aberration correction value that makes the second evaluation index show a predetermined value; and computationally determining the second approximate straight line from information stored in advance, to indicate a dependency of the spherical aberration correction on the focus offset for the second evaluation index and the detected second spherical aberration correction value.

8. The method according to claim 6, wherein the information is information on the inclination of the first approximate straight line, indicating the dependency of the spherical aberration correction on the focus offset for the first evaluation index.

9. The method according to claim 7, wherein the information is information on the inclination of the second approximate straight line, indicating the dependency of the spherical aberration correction on the focus offset for the second evaluation index.

10. The method according to claim 1, wherein the first evaluation index is an amplitude value of a cross-track signal according to a push-pull signal.

11. The method according to claim 10, wherein the amplitude value of the cross-track signal is detected during jumping a track.

12. The method according to claim 1, wherein the second evaluation index is one of an amplitude value of the reproduced signal, an asymmetry value of the reproduced signal, a timing jitter value of the reproduced signal, a statistically processed value of a likelihood of a difference at a time of joining predetermined paths for Viterbi decoding and an error rate of the reproduced signal.

13. The method according to claim 12, wherein the amplitude value of the reproduced signal is a value based on a standard deviation value of a sample data group obtained by synchronously or asynchronously sampling the reproduced signal with a clock integer times of a channel clock.

14. The method according to claim 10, wherein the amplitude value of the cross-track signal is detected by way of a first measurement conducted by fixing the focus offset or the spherical aberration correction to a reference value in a measurement region and a second measurement conducted by changing the focus offset or the spherical aberration correction in the measurement region and standardizing results of the second measurement by means of results of the first measurement.

15. The method according to claim 1, wherein the detection according to the second evaluation index includes a recording operation.

16. An information recording/reproduction apparatus comprising:

a semiconductor laser for emitting a light beam;

an objective lens for focusing the light beam emitted from the semiconductor laser onto a recording medium;

a mechanism for correcting spherical aberration appearing in the light beam;

a focus control circuit for effecting focus control of the light beam by driving the objective lens;

a circuit for adding a focus offset to the focus control; and a controller for executing the adjustment method according to claim h to set a determined spherical aberration correction value and a determined focus offset value, respectively, in the mechanism for correcting spherical aberration and the circuit for adding a focus offset.

17. The apparatus according to claim 16, wherein the controller executes a method of adjusting spherical aberration correction and focus offset of a light beam, said method comprising steps of:

detecting a first approximate straight line indicating a first relationship between the spherical aberration correction and the focus offset according to a first evaluation index indicating quality of a cross-track signal;

detecting a second approximate straight line indicating a second relationship between the spherical aberration correction and the focus offset according to a second evaluation index indicating a quality of a reproduced signal;

determining a spherical aberration correction value and a focus offset value to be adjusted from an intersection of the first approximate straight line and the second approximate straight line; and adjusting a spherical aberration correction circuit and a focus offset circuit using the determined values, wherein the step of detecting the first approximate straight line includes:

measuring a dependency of the first evaluation index on the focus offset value on a pre-selected single spherical aberration correction value and detecting a first focus offset value that makes the first evaluation index show a predetermined value; and computationally determining the first approximate straight line from information stored in advance to indicate a dependency of the focus offset on the spherical aberration correction for the first evaluation index and the detected first focus offset value.

18. The apparatus according to claim 17, wherein the step of detecting the second approximate straight line includes:

measuring a dependency of the second evaluation index on the focus offset value on a pre-selected single spherical aberration correction value and detecting a second focus offset value that makes the second evaluation index show a predetermined value; and computationally determining the second approximate straight line from information stored in advance to indicate a dependency of the focus offset on the spherical aberration correction for the second evaluation index and the detected second focus offset value.

19. The apparatus according to claim 16, wherein the controller executes a method of adjusting spherical aberration correction and focus offset of a light beam, said method comprising steps of:

detecting a first approximate straight line indicating a first relationship between the spherical aberration correction and the focus offset according to a first evaluation index indicating quality of a cross-track signal;

detecting a second approximate straight line indicating a second relationship between the spherical aberration correction and the focus offset according to a second evaluation index indicating a quality of a reproduced signal;

determining a spherical aberration correction value and a focus offset value to be adjusted from an intersection of the first approximate straight line and the second approximate straight line; and adjusting a spherical aberration correction circuit and a focus offset circuit using the determined values, wherein the step of detecting the second approximate straight line includes:

measuring a dependency of the second evaluation index on the focus offset value on a pre-selected single spherical aberration correction value and detecting a second focus offset value that makes the second evaluation index show a predetermined value; and computationally determining the second approximate straight line from information stored in advance to indicate a dependency of the focus offset on the spherical aberration correction for the second evaluation index and the detected second focus offset value.

* * * * *